United States Patent Office 2,712,559
Patented July 5, 1955

2,712,559

TREATMENT OF HYDROCARBON GASES CONTAINING ACETYLENE

E. O. Box, Jr., Bartlesville, Okla., assignor to Phillips Petroleum Company, a corporation of Delaware No Drawing. Application July 3, 1952,
Serial No. 297,170

11 Claims. (Cl. 260—605)

This invention relates to the removal of acetylene from gaseous mixtures. In one of its more specific aspects it relates to the production of acetaldehyde by the catalytic hydration of acetylene. In another of its more specific aspects it relates to the removal of acetylene from a gaseous mixture by treatment of the mixture with steam and a zinc zirconate catalyst. In still another of its more specific aspects it relates to a process for removing acetylene from a gaseous stream, containing low concentrations of acetylene, as a useful compound.

In the production of furnace blacks and carbon blacks, the effluent gases from the reactors are found to contain from about 0.1 to 1 mol per cent acetylene, and more generally, from 0.6 to 0.8 mol per cent acetylene. Since the other constituents of this gas are nitrogen, hydrogen, and the oxides of carbon, this gas stream has been considered to have little potential value and has been expelled as a waste gas. The recovery of the small concentrations of acetylene present in this waste gas, as a useful acetylene compound, provides an additional source of acetylene and also an improvement in the overall economic status of the furnace black process.

The reduction in acetylene concentration of olefin-rich hydrocarbon streams is also a major importance in refinery operations. For instance, ethylene can be produced in pebble heaters by the cracking of ethane, propane, and butane fractions at high temperatures and the resulting ethylene-rich product stream is found to be contaminated with a quantity of acetylene sometimes as large as 10 per cent, but more usually from 0.1 to 4 or 5 per cent. The presence of acetylene in this ethylene-rich stream is highly undesirable because of the deleterious effect which it has on many processes in which the ethylene-rich stream may subsequently be used. For example, there is a substantial increase in aluminum chloride consumption in the alkylation of an acetylene-contaminated ethylene stream in an aluminum chloride catalyzed process. The removal of acetylene from ethylene-rich streams is a necessity for unrestricted utilization of these hydrocarbon streams.

The recovery of acetylene from dilute gaseous streams is not readily accomplished and the removal of acetylene from olefinic hydrocarbon streams is particularly difficult. The separation of ethylene and acetylene hydrocarbons by fractionation is not possible due to the small difference in volatility of these two compounds and separation by an adsorption and/or absorption process is difficult because the adsorption and/or absorption characteristics of these two hydrocarbon fractions are quite similar. Consequently, it has usually been found preferable to deacetylize a gaseous stream, and particularly one containing ethylene, by processes based on selective chemical reaction.

In at least one modification of this invention at least one of the following objects is obtained.

It is an object of this invention to provide a catalytic process for the hydration of acetylene.

It is another object to provide a process for the removal of acetylene from a mixture of gases containing acetylene.

It is still another object to provide a catalyst for the hydration of acetylene in the presence of other unsaturated hydrocarbons.

It is still another object to provide a process for producing acetaldehyde from a mixture of gases containing small quantities of acetylene.

It is still another object to provide a process for removing acetylene from the effluent of a process such as the production of furnace carbon black or a hydrocarbon cracking process.

Various chemical reactions, such as hydrogenation, hydration, and polymerization have been applied to the recovery of acetylene from gaseous streams. The recovery of acetylene by hydration with steam in the presence of a catalyst to form acetaldehyde provides a method of producing a gas suitable as a charge material in other processes and also produces a chemical material of value since acetaldehyde is a parent raw material in a great many chemical processes. The hydration process, however, has heretofore not been found effective for the reaction of acetylene in dilute gaseous streams and has therefore not been widely used. I have discovered that a catalyst of zinc zirconate gives good conversions in the hydration of acetylene in gaseous streams in which the acetylene concentration is very low and permits the recovery of such acetylene as a marketable chemical. I have also discovered that the removal of acetylene from a gaseous stream, by passing said stream over a catalyst of zinc zirconate at elevated temperatures and in the presence of steam, can be accomplished when the gaseous hydrocarbon stream is rich in unsaturates, for example olefins such as ethylene and without substantial loss of ethylene from said hydrocarbon stream.

The process conditions for the process of my invention are, in general, very mild. Normally atmospheric pressure can be used; however, the use of superatmospheric pressures enables higher space velocities to be used. Pressures in the range of atmospheric to 400 p. s. i. g. are preferred. Pressure is not critical in the reaction, thus the pressure employed will be dictated by the economics involved. The space velocities used can vary within the range of from 100 to about 3000 volumes of gas per volume of catalyst per hour, but usually a space velocity of 200 to 700 is preferred. The temperatures used are above the boiling point of water so that the acetylene is contacted with steam and are generally in the broad range of 250 to 400° C. and a preferred range of 300–360° C. The amounts of steam employed in the hydration process can be varied within wide limits, a molar ratio of steam to acetylene of from 4:1 to 40:1 being satisfactory and a ratio of about 14:1 is preferred. A high ratio of steam to acetylene is usually employed since the side reactions of hydrogenation and polymerization of acetylene are inhibited under these conditions. In the practice of my invention with the recovery of acetylene from an effluent gas of high abrasion furnace carbon black reactors, the addition of steam in the hydration process is usually not necessary because this gas stream ordinarily contains sufficient moisture to result in a steam-acetylene ratio of about 14:1.

The zinc zirconate catalyst used in the practice of my invention is prepared, for example by admixing powdered zinc zirconate with 10 per cent by weight of a lubricating and binding agent, e. g., hydrogenated corn oil, pelleting the admixture, and removing the hydrogenated corn oil from the pellets by heating in air at a temperature in the range of 300 to 500° C. The zinc zirconate used in the manufacture of my catalyst is available commercially in powdered form and requires no further treatment. The binder-lubricant is used to improve the pelleting operation of the zinc zirconate powder and an amount more or less than 10 per cent can be used as necessary to form suitable pellets. The process conditions employed for the removal of the binder-lubricant which can be used, are also not critical, so long as most of the material is removed.

If desired the zinc zirconate catalyst can be supported upon an inert carrier. Suitable supporting materials can include silica-alumina, alumina and natural clays, for example, bentonite.

The acetaldehyde produced can be removed from the effluent gaseous stream by known methods, for example, adsorption, solvent extraction, distillation, etc.

*Example I*

A synthetic high abrasion furnace carbon black reactor effluent gas of the following composition was used as a feed material:

| | Mol per cent |
|---|---|
| Acetylene | 0.79 |
| Carbon monoxide | 12.5 |
| Carbon dioxide | 4.5 |
| Hydrogen | 16.0 |
| Nitrogen | 66.2 |

In a run of 6 hours' duration employing a pelleted zinc zirconate catalyst at temperatures in the range of 335 to 351° C., (temperature was controlled manually) atmospheric pressure, space velocity of 470 volumes of gas per volume of catalyst per hour, and a steam-acetylene ratio of 14 to 1, a single pass yield of acetaldehyde of 15.1 weight per cent of the acetylene in the feed was obtained. The total recovery of acetylene, as the aldehyde and polymer, was 25.4 weight per cent of the acetylene in the feed.

*Example II*

In another run employing a pelleted zinc zirconate catalyst and the same synthetic high abrasion reactor of effluent gas stream of Example I as feed material, a single pass yield of acetaldehyde of 24.4 weight per cent of the acetylene in the feed was obtained in a 7-hour run at a temperature of about 332° C., atmospheric pressure, space velocity of 280 volumes of gas per volume of catalyst per hour and steam-acetylene ratio 14:1. The total acetylene recovered in this pass as acetaldehyde and polymer was 48 weight per cent of the acetylene in the feed.

Reasonable variations and modifications are possible within the scope of the disclosure of the present invention, the essence of which is that acetylene in low concentration in a gaseous mixture can be hydrated to acetaldehyde over a zinc zirconate catalyst so as to remove the acetylene from the mixture and recover a valuable product.

I claim:

1. A process for the production of acetaldehyde which comprises reacting acetylene with steam in the presence of a zinc zirconate catalyst comprising zinc zirconate.

2. In the process for the removal of acetylene from a mixture of gases comprising a minor amount of acetylene together with substantial amounts of free-hydrogen and ethylene which comprises contacting said mixture with steam the improvement which comprises conducting the reaction in the presence of a catalyst consisting essentially of zinc zirconate whereby the acetylene is substantially removed without appreciable removal of said hydrogen and ethylene.

3. In the process for the hydration of acetylene which comprises subjecting acetylene to reaction with steam the improvement which comprises conducting the reaction in the presence of a catalyst consisting essentially of zinc zirconate.

4. The process of claim 3 wherein the catalyst is supported upon an inert support.

5. A process for the production of acetaldehyde by the selective hydration of acetylene which is present as a minor constituent of a gaseous mixture which comprises subjecting said gaseous mixture to reaction with steam in the presence of a catalyst consisting essentially of zinc zirconate at a temperature in the range 300–360° C., space velocities in the range 100–3000 volumes of gas per volume of catalyst per hour, pressures in the range atmospheric to 400 p. s. i. g. and steam to acetylene ratio of from 4:1 to 40:1, and separating resulting acetaldehyde from said gaseous mixture.

6. The process of claim 5 wherein the catalyst is supported upon an inert support.

7. A process for selectively removing acetylene from a normally gaseous mixture containing a minor amount of acetylene together with substantial amounts of free hydrogen and ethylene without appreciable removal of said ethylene which comprises contacting said mixture with steam in the presence of a catalyst consisting essentially of zinc zirconate at a temperature in the range 300–360° C., space velocity from 100 to 3000 volumes of gas per volume of catalyst per hour pressures in the range atmospheric to 400 p. s. i. g. and steam to acetylene ratio of from 4:1 to 40:1, selectively hydrating said acetylene thereby, and separating resulting reaction products from said gaseous mixture.

8. A process for the removal of acetylene from a mixture of gases comprising a minor amount of acetylene together with substantial amounts of free-hydrogen and olefins which comprises contacting said mixture with steam at substantially atmospheric pressure and in the presence of a zinc zirconate catalyst whereby the acetylene is substantially removed without appreciable removal of said hydrogen and olefins.

9. A process for selectively removing acetylene from a normally gaseous mixture containing a minor amount of acetylene together with substantial amounts of free-hydrogen and olefins without appreciable removal of said olefins which comprises contacting said mixture with steam in the presence of a zinc zirconate catalyst at a temperature in the range 250 to 400° C., space velocity from 100 to 3000 volumes of gas per volume of catalyst per hour, substantially atmospheric pressure, and steam to acetylene ratio of from 4:1 to 40:1, selectively hydrating said acetylene thereby and separating resulting reaction products from said gaseous mixture.

10. A process for the production of acetaldehyde by the selective hydration of acetylene which is present as minor constituent of a gaseous mixture which comprises subjecting said gaseous mixture in the presence of a zinc zirconate catalyst at a temperature in the range 250 to 400° C., space velocities in the range of 200 to 700 volumes of gas per volume of catalyst per hour, pressure in the range of atmospheric to 400 p. s. i. g. and steam to acetylene ratio of from 4:1 to 14:1.

11. The process of claim 10 wherein the catalyst is supported upon an inert support.

References Cited in the file of this patent

UNITED STATES PATENTS

| 1,926,575 | Zobel et al. | Sept. 12, 1933 |
| 2,045,841 | Dreyfus | June 30, 1936 |
| 2,523,686 | Engel | Sept. 26, 1950 |